US011404050B2

(12) United States Patent
Ryu et al.

(10) Patent No.: US 11,404,050 B2
(45) Date of Patent: Aug. 2, 2022

(54) ELECTRONIC APPARATUS AND METHOD FOR CONTROLLING THEREOF

(71) Applicant: SAMSUNG ELECTRONICS CO., LTD., Suwon-si (KR)

(72) Inventors: Seonghan Ryu, Suwon-si (KR); Donghyeon Lee, Suwon-si (KR); Eunji Lee, Suwon-si (KR); Jongsun Lee, Suwon-si (KR); Yongjin Cho, Suwon-si (KR); Sungja Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 133 days.

(21) Appl. No.: 15/931,946

(22) Filed: May 14, 2020

(65) Prior Publication Data
US 2020/0365145 A1 Nov. 19, 2020

(30) Foreign Application Priority Data

May 16, 2019 (KR) .................. 10-2019-0057702
Mar. 23, 2020 (KR) .................. 10-2020-0035168

(51) Int. Cl.
*G10L 15/18* (2013.01)
*G10L 15/06* (2013.01)
*G10L 15/22* (2006.01)

(52) U.S. Cl.
CPC ........ *G10L 15/1815* (2013.01); *G10L 15/063* (2013.01); *G10L 15/22* (2013.01); *G10L 2015/223* (2013.01)

(58) Field of Classification Search
CPC ........ G06N 20/00; G06N 3/08; G06K 9/6218; G06K 9/6267; G06F 40/30;
(Continued)

(56) References Cited

U.S. PATENT DOCUMENTS 9,633,006 B2    4/2017  Ryu et al.
9,886,958 B2 *  2/2018  Celikyilmaz ........... G10L 17/04
(Continued)

FOREIGN PATENT DOCUMENTS

KR       10-1414171       7/2014
KR    10-2016-0060821     5/2016
(Continued)

OTHER PUBLICATIONS

Ustalov et al., "Watset: Local-Global Graph Clustering with Applications in Sense and Frame Induction", Computational Linguistics, vol. 20, No. 20, Apr. 8, 2019, 58 pages.

*Primary Examiner* — Linda Wong
(74) *Attorney, Agent, or Firm* — Nixon & Vanderhye P.C.

(57) ABSTRACT

Disclosed is a method for controlling an electronic apparatus. A method for controlling an electronic apparatus includes: obtaining a speech signal; obtaining a first sentence based on the speech signal and obtaining a first feature value for the first sentence by inputting the first sentence to a natural language understanding module; obtaining first semantic information corresponding to the first sentence and obtaining a second feature value for the first semantic information by inputting the first semantic information to a natural language generation module; and training the natural language understanding module and the natural language generation module to provide the first feature value and the second feature value within a predetermined distance in a vector space.

20 Claims, 13 Drawing Sheets

(58) Field of Classification Search
CPC ............. G06F 16/3344; G06F 16/3329; G06F 16/90332; G06F 40/56; G10L 15/00; G10L 15/1815; G10L 15/18; G10L 15/02; G10L 17/26; G10L 15/063; G10L 15/22; G10L 2015/223; G10L 15/1822; G10L 13/027

See application file for complete search history.

(56) References Cited

U.S. PATENT DOCUMENTS

| | | | |
|---|---|---|---|
| 10,055,686 B2 | 8/2018 | Huang et al. | |
| 10,380,264 B2 * | 8/2019 | Lee | G06F 40/268 |
| 10,509,864 B2 * | 12/2019 | Kang | G06F 40/284 |
| 10,664,662 B2 * | 5/2020 | Awadallah | G06F 40/216 |
| 10,929,392 B1 * | 2/2021 | Cheng | G06N 3/08 |
| 2014/0257794 A1 * | 9/2014 | Gandrabur | G10L 15/1822 704/9 |
| 2017/0372199 A1 | 12/2017 | Hakkani-Tur et al. | |
| 2018/0046937 A1 * | 2/2018 | Allen | G06N 5/04 |
| 2018/0060301 A1 | 3/2018 | Lie et al. | |
| 2018/0075846 A1 * | 3/2018 | Gandrabur | G10L 15/22 |
| 2018/0336183 A1 * | 11/2018 | Lee | G06N 5/022 |
| 2018/0373979 A1 * | 12/2018 | Wang | G06N 3/0445 |
| 2019/0114545 A1 * | 4/2019 | Lee | G06N 3/08 |
| 2019/0163747 A1 * | 5/2019 | Kang | G06F 40/216 |
| 2019/0236148 A1 * | 8/2019 | DeFelice | G06F 40/216 |
| 2019/0294661 A1 * | 9/2019 | Sarkar | G06F 40/30 |
| 2020/0043469 A1 * | 2/2020 | Raux | G06N 20/00 |
| 2020/0211528 A1 * | 7/2020 | Lee | G10L 25/69 |
| 2020/0395028 A1 * | 12/2020 | Kameoka | G06N 3/0445 |

FOREIGN PATENT DOCUMENTS

| | | | |
|---|---|---|---|
| KR | 10-1664278 | 10/2016 | |
| WO | WO-2012121728 A1 * | 9/2012 | ........ G06F 17/30011 |

* cited by examiner

ELECTRONIC APPARATUS AND METHOD FOR CONTROLLING THEREOF

CROSS-REFERENCE TO RELATED APPLICATIONS

This application is based on and claims priority under 35 U.S.C. § 119 to Korean Patent Application No. 10-2020-0035168, filed on Mar. 23, 2020, and Korean Patent Application No. 10-2019-0057702, filed on May 16, 2019, in the Korean Intellectual Property Office, the disclosures of which are incorporated by reference herein in their entireties.

BACKGROUND

Field

The disclosure relates to an electronic apparatus and a method for controlling thereof. For example, the disclosure relates to an electronic apparatus capable of providing a response to a user input in a dialogue system as a natural language and a method for controlling thereof.

Description of Related Art

In recent years, artificial intelligence (AI) systems have been used in various fields. An AI system may be a system in which a machine learns, judges, and iteratively improves analysis and decision making, unlike an existing rule-based smart system. As the use of AI systems increases, for example, an accuracy, a recognition rate and understanding or anticipation of a user's taste may be correspondingly increased. As such, existing rule-based smart systems are gradually being replaced by deep learning-based AI systems.

AI technology may include machine learning, for example deep learning, and elementary technologies that utilize machine learning.

Machine learning may refer, for example, to an algorithmic technology that is capable of classifying or learning characteristics of input data. Element technology may refer, for example, to a technology that simulates functions, such as recognition and judgment of a human brain, using machine learning algorithms, such as deep learning. Machine learning may include technical fields such as linguistic understanding, visual understanding, reasoning, prediction, knowledge representation, motion control, or the like. Various fields implementing AI technology may include the following. Linguistic understanding may refer, for example, to a technology for recognizing, applying, and/or processing human language or characters and may include natural language processing, machine translation, dialogue system, question and answer, speech recognition or synthesis, and the like.

Recently, many enterprises have been provided with a dialog system that can provide a response to a user input (especially, a user speech) using an artificial intelligence (AI) model. The dialogue system typically includes an automatic speech recognition (ASR) module, a natural language understanding (NLU) module, a dialog management (DM) module, a natural language generation (NLG) module, and a text-to-speech (TTS) module.

In order for an electronic apparatus to provide an optimal response to a user using a dialogue system, a processing result of each of the above-described modules should be accurate. For a natural dialogue between a human and an electronic apparatus, the natural language generation module needs to generate an optimal natural language responsive to the user speech (or voice). If the natural language generation module provides a strange or awkward response, a problem of lowering the usability of the dialogue system may occur. Accordingly, it is a very important task for a natural language generation module to generate a natural language including an accurate response in a dialogue system, and in order to address this problem, there is a need for an efficient learning (or training) method for a dialogue system.

SUMMARY

Embodiments of the disclosure address the above-described necessity, and embodiments of the disclosure provide an efficient learning (training) method for improving a performance of a dialogue system.

According to an example embodiment, an electronic apparatus includes: a memory configured to include at least one instruction and a processor connected to the memory and configured to control the electronic apparatus, and the processor, by executing the at least one instruction, is configured to control the electronic apparatus to: obtain a speech signal, obtain a first sentence based on the speech signal and obtain a first feature value for the first sentence by inputting the first sentence to a natural language understanding module comprising processing circuitry and/or executable program elements, obtain first semantic information corresponding to the first sentence and obtain a second feature value for the first semantic information by inputting the first semantic information to a natural language generation module comprising processing circuitry and/or executable program elements, and train the natural language understanding module and the natural language generation module so that the first feature value and the second feature value exist within a predetermined distance in a vector space.

According to another example embodiment, a method for controlling an electronic apparatus includes: obtaining a speech signal; obtaining a first sentence based on the speech signal and obtaining a first feature value for the first sentence by inputting the first sentence to a natural language understanding module; obtaining first semantic information corresponding to the first sentence and obtaining a second feature value for the first semantic information by inputting the first semantic information to a natural language generation module; and training the natural language understanding module and the natural language generation module so that the first feature value and the second feature value exist within a predetermined distance in a vector space.

According to various example embodiments, a performance of a dialogue system may be improved through an efficient learning (or training) method. Accordingly, a usability of the dialogue system may be increasing.

Example effects that can be obtained or predicted due to embodiments of the disclosure are directly or implicitly disclosed in the detailed description of embodiments of the disclosure. For example, various effects predicted according to various example embodiments of the disclosure will be described in the detailed description below.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
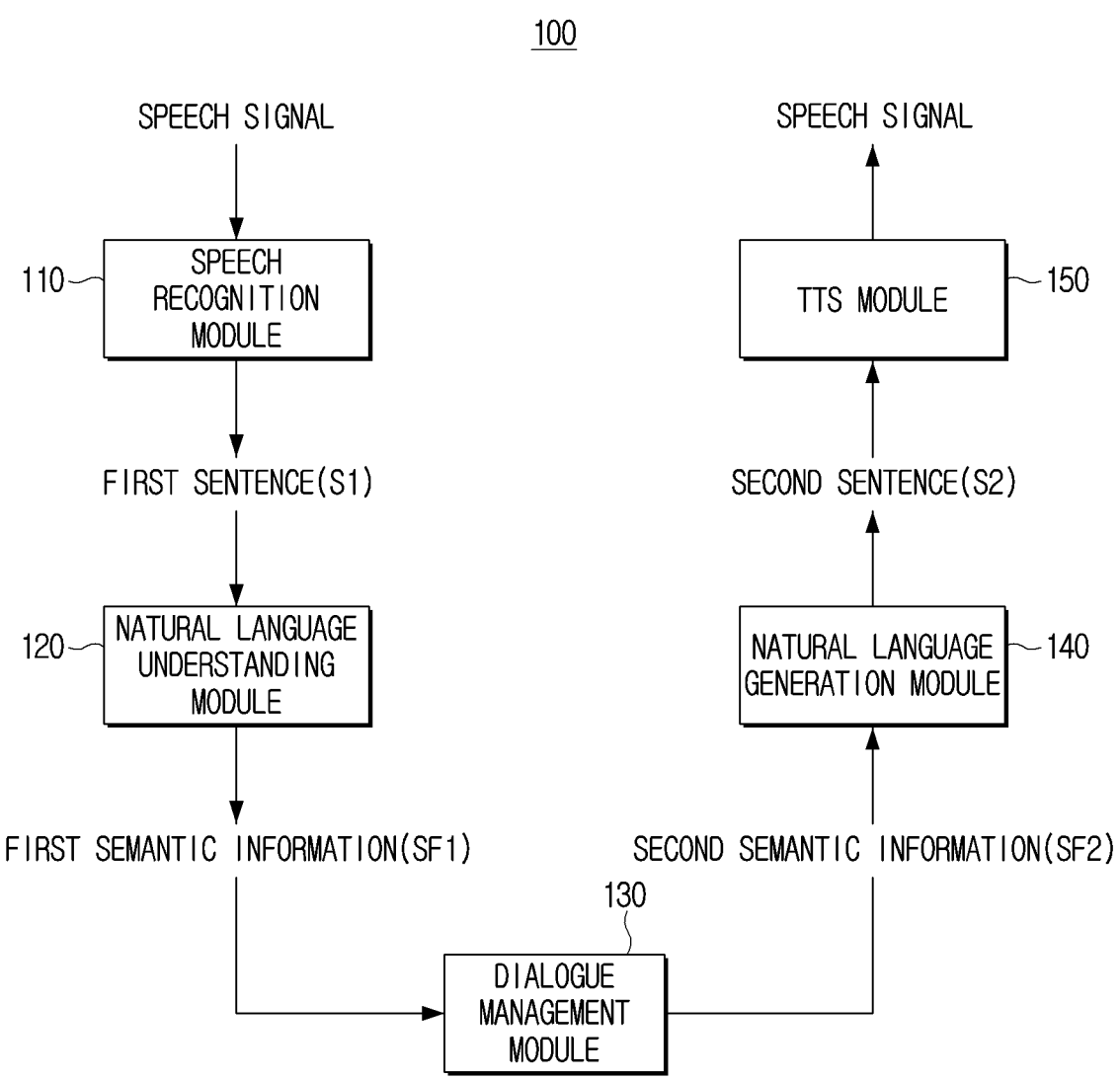
FIG. 1 is a diagram illustrating an example operation of an electronic apparatus according to an embodiment.

Terms used in the present disclosure are briefly described, and the disclosure is described in greater detail.

General terms that are currently widely used may be selected as terms for describing the embodiments of the disclosure in consideration of functions in the disclosure, but other terminology may be understood based on the intention of those skilled in the art of the disclosure, the emergence of a new technique, and the like. In addition, in a specific configuration, additional terms may be selected herein. In this configuration, the meaning of such terms may be mentioned in detail in a corresponding portion of the disclosure. Therefore, the terms used in embodiments of the disclosure should be defined based on the meaning of the terms and the contents throughout the disclosure rather than simply the names of the terms.

The example embodiments are capable of various modifications and have various embodiments, and specific embodiments are illustrated in the drawings and described in detail in the description. It should be understood, however, that it is not intended to limit the scope of the embodiments but includes all modifications, equivalents, and alternatives falling within the scope of the disclosure. When it is decided that a detailed description for the known art related to the disclosure may unnecessarily obscure the gist of the disclosure, the detailed description may be omitted.

As used herein, the terms "first," "second," or the like may be used to refer to corresponding components, regardless of importance of order, and may be used to distinguish a component from another without limiting the components.

A singular expression includes a plural expression, unless otherwise specified. It is to be understood that the terms such as "comprise" or "consist of" are used herein to designate a presence of a characteristic, number, step, operation, element, component, or a combination thereof, and these terms do not to preclude a presence or a possibility of adding one or more of other characteristics, numbers, steps, operations, elements, components or a combination thereof.

Hereinafter, various example embodiments of the disclosure will be described in greater detail with reference to the accompanying drawings. However, the present disclosure may be implemented in various different forms, and the disclosure is not limited to only the embodiments described herein. In addition, in the drawings, portions unrelated to the description may be omitted to avoid obscuring the disclosure, and similar elements will be denoted by similar reference numerals throughout the disclosure.

FIG. 1 is a diagram illustrating an example operation of an electronic apparatus according to an embodiment.

Referring to FIG. 1, an electronic apparatus 100 (or a dialogue system) may include a speech recognition module (e.g., including processing circuitry and/or executable program elements) 110, a natural language understanding module (e.g., including processing circuitry and/or executable program elements) 120, a dialogue management module (e.g., including processing circuitry and/or executable program elements) 130, a natural language generation module (e.g., including processing circuitry and/or executable program elements) 140, and a text-to-speech (TTS) module (e.g., including processing circuitry and/or executable program elements) 150. The electronic apparatus 100 may include, for example, and without limitation, at least one of a smartphone, a tablet personal computer (PC), a desktop PC, a laptop PC, a smart television (TV), a smart speaker, or the like.

The electronic apparatus 100 may input a speech signal (e.g., user speech) to the speech recognition module 110 to obtain a first sentence S1. The electronic apparatus 100 may input the first sentence S1 to the natural language understanding module 120 to obtain first semantic information SF1 for the first sentence S1. Semantic information may refer, for example, to a semantic frame as information indicating a meaning of a sentence. The semantic information may include a plurality of semantic items, and may include, for example, a domain, an intention, a slot, etc.

The electronic apparatus 100 may input the first semantic information SF1 to the dialogue management module 130 to obtain second semantic information SF2. The second semantic information SF2 may refer, for example, to semantic information corresponding to a second sentence S2 which may, for example, be a response to the first sentence S1. The electronic apparatus 100 may input the second semantic information SF2 to the natural language generation module 140 to obtain the second sentence S2. The electronic apparatus 100 may generate and output a speech signal by inputting the second sentence S2 to the TTS module 150.

To provide a user with an optimal and/or improved response, it is important for the electronic apparatus 100 to improve performance of the aforementioned modules, and an efficient learning method for each module is necessary. A learning method of each module of the electronic apparatus 100 will be described in greater detail below.

Figure 2:
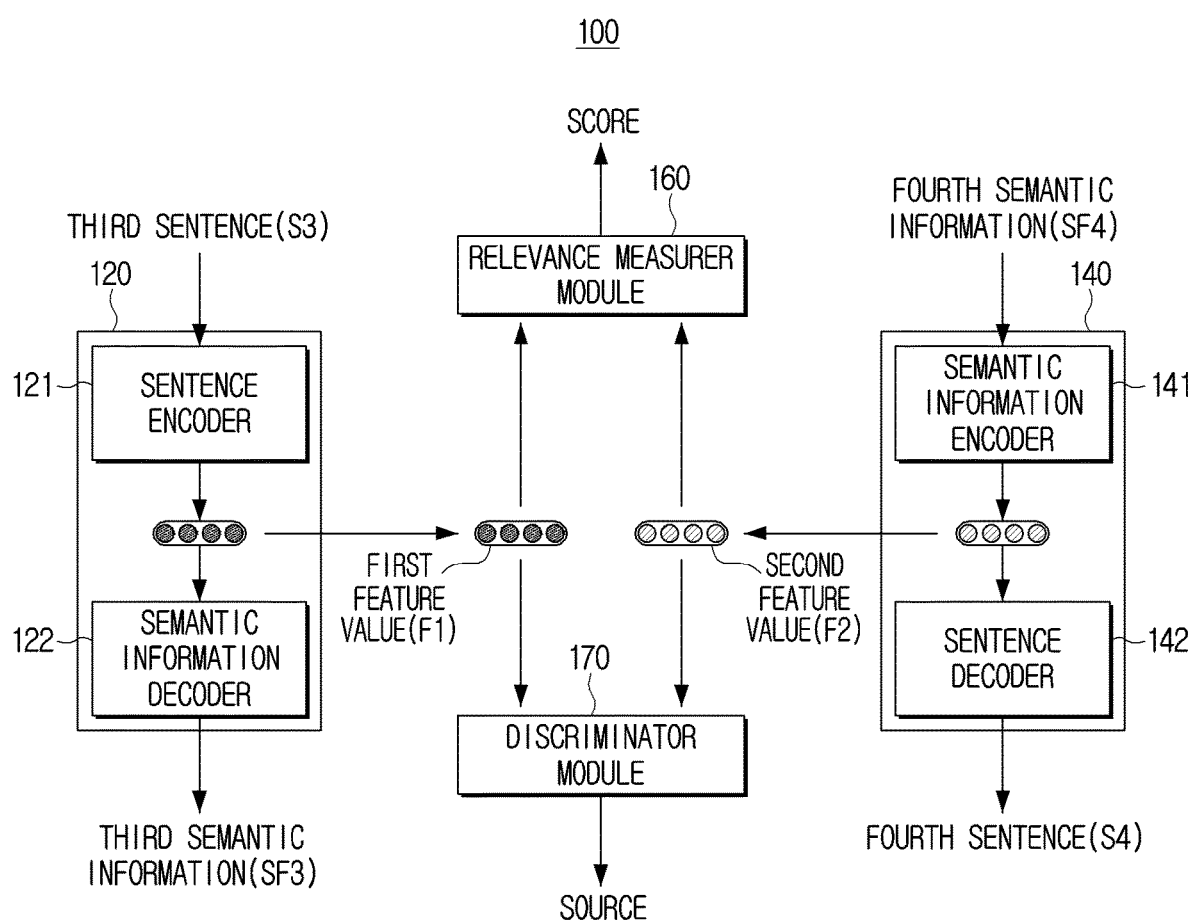
FIG. 2 is a diagram illustrating an example method for training (or learning) a natural language understanding module and a natural language generation module according to an embodiment.

FIG. 2 is a diagram illustrating an example method for training (or learning) a natural language understanding module and a natural language generation module according to an embodiment.

The natural language understanding module 120 may include a sentence encoder (e.g., including processing circuitry and/or executable program elements) 121 and a semantic information decoder (e.g., including processing circuitry and/or executable program elements) 122. The sentence encoder 121 is a module configured to receive a natural language sentence to output a feature value for the input natural language sentence. The semantic information decoder 122 is a module configured to receive a feature value to output a natural language for the input feature value.

The electronic apparatus 100 may input a third sentence S3 to the natural language understanding module 120 to obtain a first feature value F1 and third semantic information SF3 for the third sentence S3. The electronic apparatus 100 may input the third sentence S3 to the sentence encoder 121 to obtain the first feature value F1, and input the first feature value F1 to the semantic information decoder 122 to obtain the third semantic information SF3. The first feature value F1 may refer, for example, to a vector value representing the feature of the third sentence S3. The feature value may be referred to, for example, as an intermediate representation.

The natural language generation module 140 may include a semantic information encoder (e.g., including processing circuitry and/or executable program elements) 141 and a sentence decoder (e.g., including processing circuitry and/or executable program elements) 142. The semantic information encoder 141 may receive semantic information (or semantic frame) and may output a feature value for the input semantic information. The sentence decoder 142 may receive the feature value and may output semantic information about the input feature value.

The electronic apparatus 100 may input fourth semantic information SF4 to the natural language generation module 140 to obtain a second feature value F2 and a fourth sentence S4 for the fourth semantic information SF4. The electronic apparatus 100 may input the fourth semantic information SF4 to the semantic information encoder 141 to obtain the second feature value F2, and input the second feature value F2 to the sentence decoder 142 to obtain the fourth sentence S4. The second feature value F2 may refer, for example, to a vector value representing the feature for the fourth semantic information SF4. The fourth semantic information SF4 may include, for example, learning data that matches the third sentence S3, and may refer, for example, to labeled data.

The electronic apparatus 100 may train the natural language understanding module 120 and the natural language generation module 140 so that the first feature value F1 and the second feature value F2 exist within a predetermined distance in the same vector space. For example, the electronic apparatus 100 may train the sentence encoder 121 and the semantic information encoder 141 so that the first feature value F1 and the second feature value F2 obtained from the third sentence S3 and the fourth semantic information SF4, which are learning data corresponding to each other, have similar values. The electronic apparatus 100 may adjust a weight value included in a functional formula to calculate a feature value included in the sentence encoder 121 and the semantic information encoder 141 so that the first feature value F1 and the second feature value F2 exist within a predetermined distance in the vector space. The weight values may be vector values.

The electronic apparatus 100 may train the natural language understanding module 120 and the natural language generation module 140 using a relevance measurer module (e.g., including processing circuitry and/or executable program elements) 160 trained to obtain a score for an associated degree of a plurality of feature values by receiving a plurality of feature values. The electronic apparatus 100 may train the sentence encoder 121, the semantic information decoder 122, the semantic information encoder 141, and the sentence decoder 142 included in the natural language understanding module 120 and the natural language generation module 140.

The electronic apparatus 100 may input the first feature value F1 and the second feature value F2 to the relevance measurer module 160 to obtain a first score for the relevance of the first feature value F1 and the second feature value F2. The electronic apparatus 100 may train the natural language understanding module 120 and the natural language generation module 140 so that the first score is greater than the predetermined score. The predetermined score may refer, for example, to a probability value, and may have, for example, a value of 0.9.

The electronic apparatus 100 may train the relevance measurer module 160. The electronic apparatus 100 may obtain a second score for relevance between the third sentence S3 and the fourth semantic information SF4, and train the relevance measurer module 160 such that the difference between the first score and the second score is less than a predetermined score (e.g., 0.02).

The electronic apparatus 100 may train the natural language understanding module 120 and the natural language generation module 140 using a discriminator module (e.g., including processing circuitry and/or executable program elements) 170. The discriminator module 170 is a module that may be trained to receive a feature value and predict a source module that generates the input feature value. The electronic apparatus 100 may input at least one of the first feature value F1 and the second feature value F2 to the discriminator module 170 to obtain the predicted module. For example, when the electronic apparatus 100 inputs the first feature value F1 into the discriminator module 170, the discriminator module 170 may output the natural language understanding module 120. The electronic apparatus 100 may identify the natural language understanding module 120 with a predicted module.

The electronic apparatus 100 may train the natural language understanding module 120 and the natural language generation module 140 so that that the predicted module obtained through the discriminator module 170 is different from the module that actually generates the first feature value F1 and the second feature value F2. The electronic apparatus 100 may train the sentence encoder 121 of the natural language understanding module 120 and the semantic information encoder 141 of the natural language generation module 140. The electronic apparatus 100 may train the sentence encoder 121 and the semantic information encoder 141 so that the discriminator module 170 may not accurately predict the sentence encoder 121 and the semantic information encoder 141 that actually generate the first feature value F1 and the second feature value F2. In other words, the electronic apparatus 100 may train the sentence encoder 121 and the semantic information encoder 141 so that the discriminator module 170 may not accurately discriminate the first feature value F1 and the second feature value F2.

For example, the electronic apparatus 100 may input the first feature value F1 to the discriminator module 170. If the natural language understanding module 120 is obtained through the discriminator module 170, it can be identified that the degree of learning of the sentence encoder 121 is insufficient since the discriminator module 170 is successful in predicting accurately. If the natural language generation module 140 is obtained through the discriminator module 170, it can be determined that the degree of learning of the sentence encoder 121 is sufficient, since accurate prediction is failed.

The electronic apparatus 100 may train the natural language understanding module 120 and the natural language generation module 140 so that the first feature value F1 and the second feature value F2 exist within a predetermined distance in a vector space using the relevance measurer module 160 and the discriminator module 170.

A learning method of the natural language understanding module 120 and the natural language generation module 140 will be described in greater detail below through a more specific example of learning data.

Figure 3:
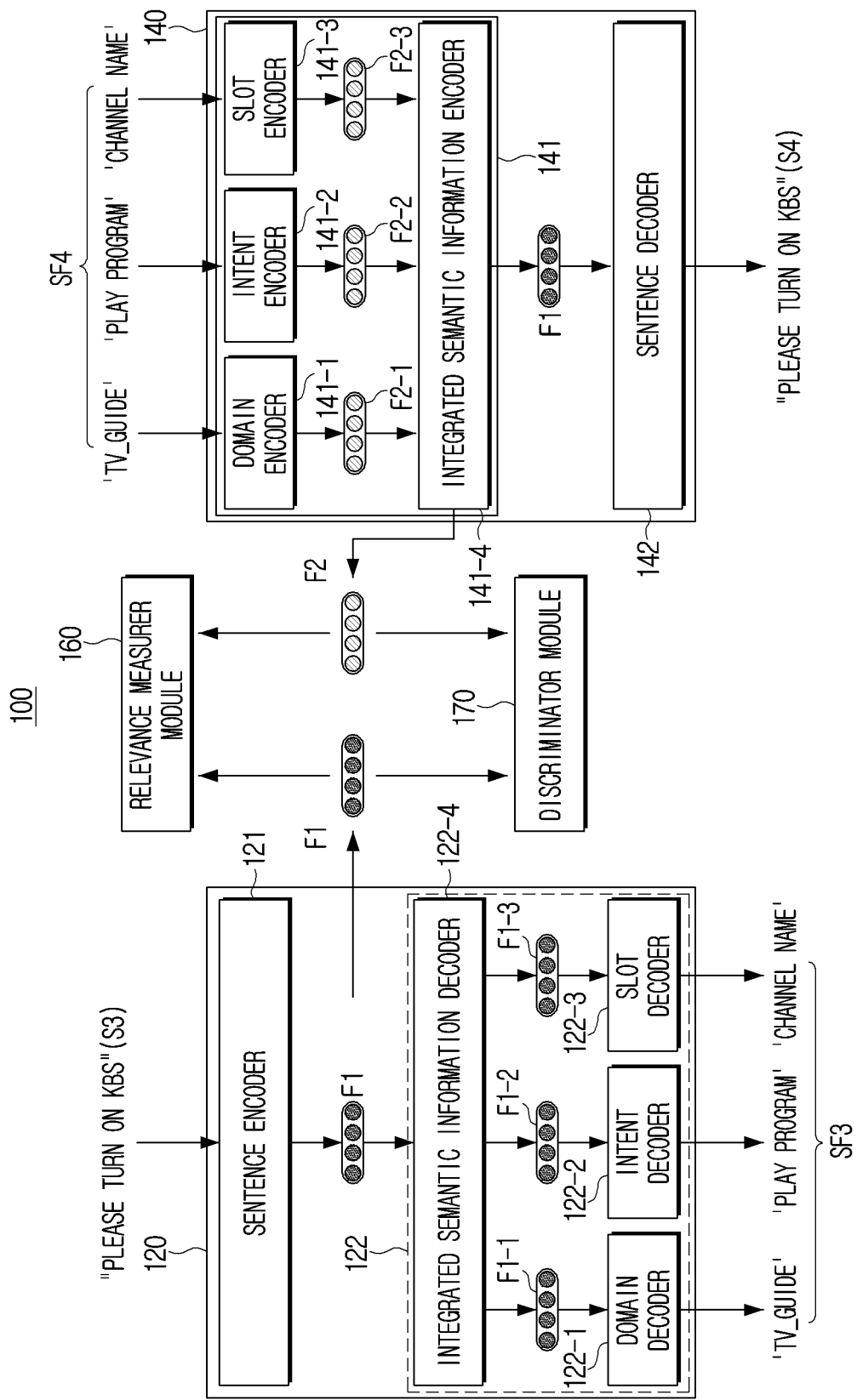
FIG. 3 is a diagram illustrating an example method of training (or learning) a natural language understanding module and a natural language generation module according to an embodiment.

FIG. 3 is a diagram illustrating an example method of training (or learning) a natural language understanding module and a natural language generation module according to an embodiment. Descriptions overlapping with those of FIG. 2 may not be repeated here.

The electronic apparatus 100 may input a third sentence (S3, "Please turn on KBS") to the sentence encoder 121 to obtain the first feature value F1. The electronic apparatus 100 may input the fourth semantic information SF4 (e.g., TV_guide, play program, channel name) corresponding to the third sentence S3 to the semantic information encoder 141 to obtain the second feature value F2. The electronic apparatus 100 may train the natural language understanding module 120 and the natural language generation module 140 so that the electronic apparatus 100 exists within a predetermined distance in the vector space of the first feature value F1 and the second feature value F2.

The semantic information encoder 141 may include a plurality of encoders corresponding to each of a plurality of semantic items. For example, the semantic information encoder 141 may include a domain encoder (e.g., including processing circuitry and/or executable program elements) 141-1, an intent encoder (e.g., including processing circuitry and/or executable program elements) 141-2, a slot encoder (e.g., including processing circuitry and/or executable program elements) 141-3, and an integrated semantic information encoder (e.g., including processing circuitry and/or executable program elements) 141-4. The electronic apparatus 100 may input a semantic item (e.g., "TV_guide", "play program", "channel name") included in the fourth semantic information SF4 to each of the domain encoder 141-1, the intention encoder 141-2, and the slot encoder 141-3 to obtain the second-one feature value F2-1, the second-two feature value F2-2, and the second-three feature value F2-3. The electronic apparatus 100 may obtain the second feature value F2 by inputting the second-one feature value F2-1, the second-two feature value F2-2, and the second-three feature value F2-3 to the integrated semantic information encoder 141-4.

The semantic information decoder 122 may include a plurality of encoders corresponding to each of the plurality of semantic items. For example, the semantic information decoder 122 may include a domain decoder (e.g., including processing circuitry and/or executable program elements) 122-1, an intent decoder (e.g., including processing circuitry and/or executable program elements) 122-2, a slot decoder (e.g., including processing circuitry and/or executable program elements) 122-3, and an integrated semantic information decoder (e.g., including processing circuitry and/or executable program elements) 122-4. The electronic apparatus 100 may input the first feature value F1 to the integrated semantic information decoder 122-4 to obtain the first-one feature value F1-1, the first-second feature value F1-2, and the first-third feature value F1-3. The electronic apparatus 100 may obtain the third semantic information (e.g., SF3, "TV_guide", "play program", "channel name") by inputting the first-one feature value F1-1, the first-two feature value F1-2, and the first-three feature value F1-3 to each of the domain decoder 122-1, the intent decoder 122-2 and the slot decoder 122-3.

FIG. 3 describes an example in which the semantic item included in the semantic information includes a domain, an intent, and a slot, but this is merely an example, and some items may be omitted and other items may be added to form the semantic information.

The electronic apparatus 100 may train the natural language understanding module 120 based on the third semantic information SF3 and the fourth semantic information SF4. For example, the electronic apparatus 100 may calculate an error value by comparing the third semantic information SF3 and the fourth semantic information SF4, and train the natural language understanding module 120 so that the calculated error value is smaller than a predetermined value. The electronic apparatus 100 may obtain a reference sentence corresponding to the fourth semantic information SF4, and train the natural language generation module 140 based on the reference sentence and the fourth sentence S4. The electronic apparatus 100 may calculate an error value by comparing the reference sentence and the fourth sentence S4, and train the natural language generation module 140 so that the calculated error value is smaller than a predetermined value.

Figure 4:
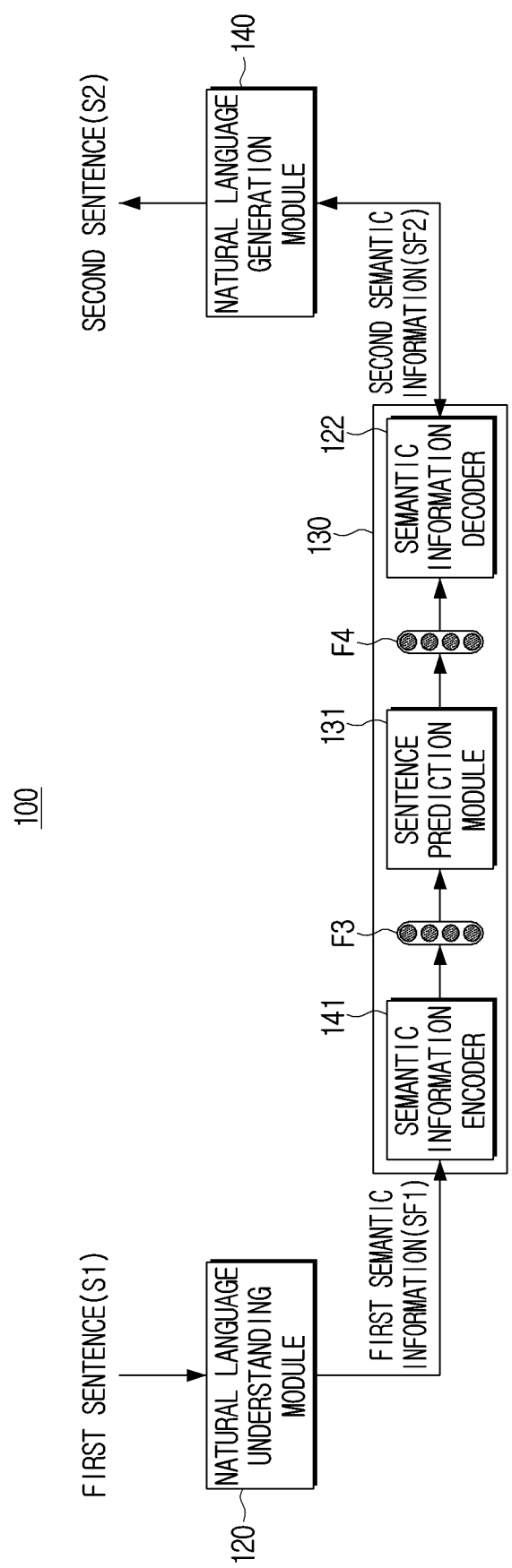
FIG. 4 is a diagram illustrating an example operation of a dialogue management module according to an embodiment.

FIG. 4 is a diagram illustrating an example operation of a dialogue management module according to an embodiment.

The electronic apparatus 100 may obtain the second semantic information SF2 by inputting the first semantic information SF1 for the first sentence S1 obtained from the natural language understanding module 120 to the dialogue management module 130. The electronic apparatus 100 may obtain the second sentence S2 by inputting the second semantic information SF2 to the natural language generation module 140.

The electronic apparatus 100 may include the semantic information encoder 141, a sentence prediction module (e.g., including processing circuitry and/or executable program elements) 131, and the semantic information decoder 122. The electronic apparatus 100 may input the first semantic information SF1 to the semantic information encoder 141 to obtain the third feature value F3. The electronic apparatus 100 may input the third feature value F3 to the sentence prediction module 131 to obtain the fourth feature value F4. The electronic apparatus 100 may input the fourth feature value F4 to the semantic information decoder 122 to obtain the second semantic information SF2.

The electronic apparatus 100 may obtain a reference sentence, which is the next sentence for the first sentence S1, and train the dialogue management module 130 based on the reference sentence and the second sentence S2. The electronic apparatus 100 may calculate an error value by comparing the reference sentence and the second sentence S2, and train the dialogue management module 130 so that the calculated error value is less than a predetermined value.

The electronic apparatus 100 may provide a response to the user in view of whether the obtained speech signal corresponds to a predetermined sentence supportable by the electronic apparatus 100. When the obtained speech signal corresponds to a predetermined sentence, the electronic apparatus 100 may, for example, sequentially input the sentence obtained based on the speech signal to the natural language understanding module, the dialogue management module, the natural language generation module, and the TTS module to obtain a sentence and provide a response corresponding to the obtained sentence to the user. If the obtained speech signal does not correspond to a predetermined sentence, the electronic apparatus 100 may provide the user with a response corresponding to a predetermined sentence without inputting the obtained sentence into the natural language generation module. Hereinafter, an operation of the electronic apparatus 100 for providing a response based on whether the obtained speech signal corresponds to a predetermined sentence will be described.

Figure 5:
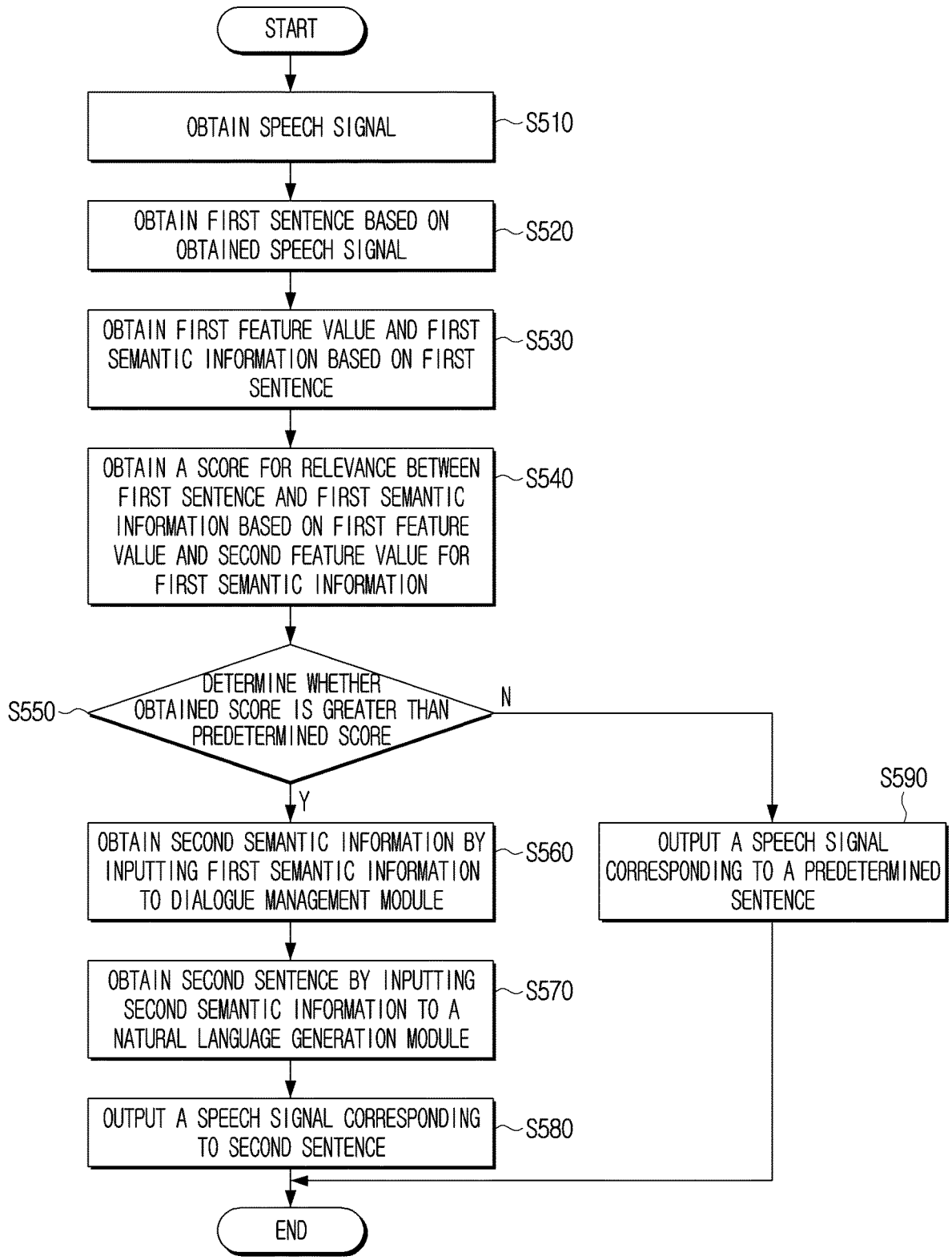
FIG. 5 is a flowchart illustrating an example method of controlling an electronic apparatus according to an embodiment.

FIG. 5 is a flowchart illustrating an example method of controlling an electronic apparatus according to an embodiment.

The electronic apparatus 100 may obtain a speech signal in operation S510. The electronic apparatus 100 may include, for example, a microphone to obtain a speech signal and obtain a speech signal from a user through a microphone.

The electronic apparatus 100 may obtain the first sentence based on the obtained speech signal in operation S520. The electronic apparatus 100 may obtain the first sentence by inputting the obtained speech signal to the speech recognition module 110.

The electronic apparatus 100 may obtain the first feature value and the first semantic information based on the first sentence in operation S530. The electronic apparatus 100 may input the first sentence into the natural language understanding module 120 to obtain the first feature value and the first semantic information in operation S530. The electronic apparatus 100 may obtain the first feature value by inputting the first sentence into the sentence encoder 121 included in the natural language understanding module 120, and input the first feature value to the semantic information decoder 122 to obtain the first semantic information.

The electronic apparatus 100 may obtain a score for the relevance between the first sentence and the first semantic information based on the second feature value for the first semantic information and the first feature value in operation S540. The electronic apparatus 100 may input the first semantic information to the semantic information encoder to obtain a second feature value, and input the second feature value and the first feature value to the relevance measurer module 160 to obtain a score for the relevance between the first sentence and the first semantic information.

The electronic apparatus 100 may determine whether the obtained score is greater than a predetermined score in operation S550. If it is determined that the obtained score is greater than the predetermined score, the electronic apparatus 100 may input the first semantic information to the dialogue management module 130 to obtain the second semantic information in operation S560. The electronic apparatus 100 may input the second semantic information to the natural language generation module 140 to obtain a second sentence in operation S570, and may output a speech signal corresponding to the second sentence in operation S580. The electronic apparatus 100 may output a speech signal corresponding to the second sentence through the speaker or display the second sentence through the display.

On the other hand, if it is determined that the obtained score is not greater than the predetermined score in operation S550, the electronic apparatus 100 may output a speech signal corresponding to a predetermined sentence in operation S590. The predetermined sentence may, for example, be a sentence corresponding to a rejection response indicating that a service for the speech signal obtained by the electronic apparatus 100 is not available (e.g., "I do not understand"). As such, the electronic apparatus 100 may determine whether the obtained speech signal corresponds to a supportable service using the relevance measurer module 160. The electronic apparatus 100 may compare a predetermined score with a score that is obtained by inputting first feature value and the second feature value to the relevance measurer module 160 to determine whether to the service for the obtained speech signal is available.

Figure 6:
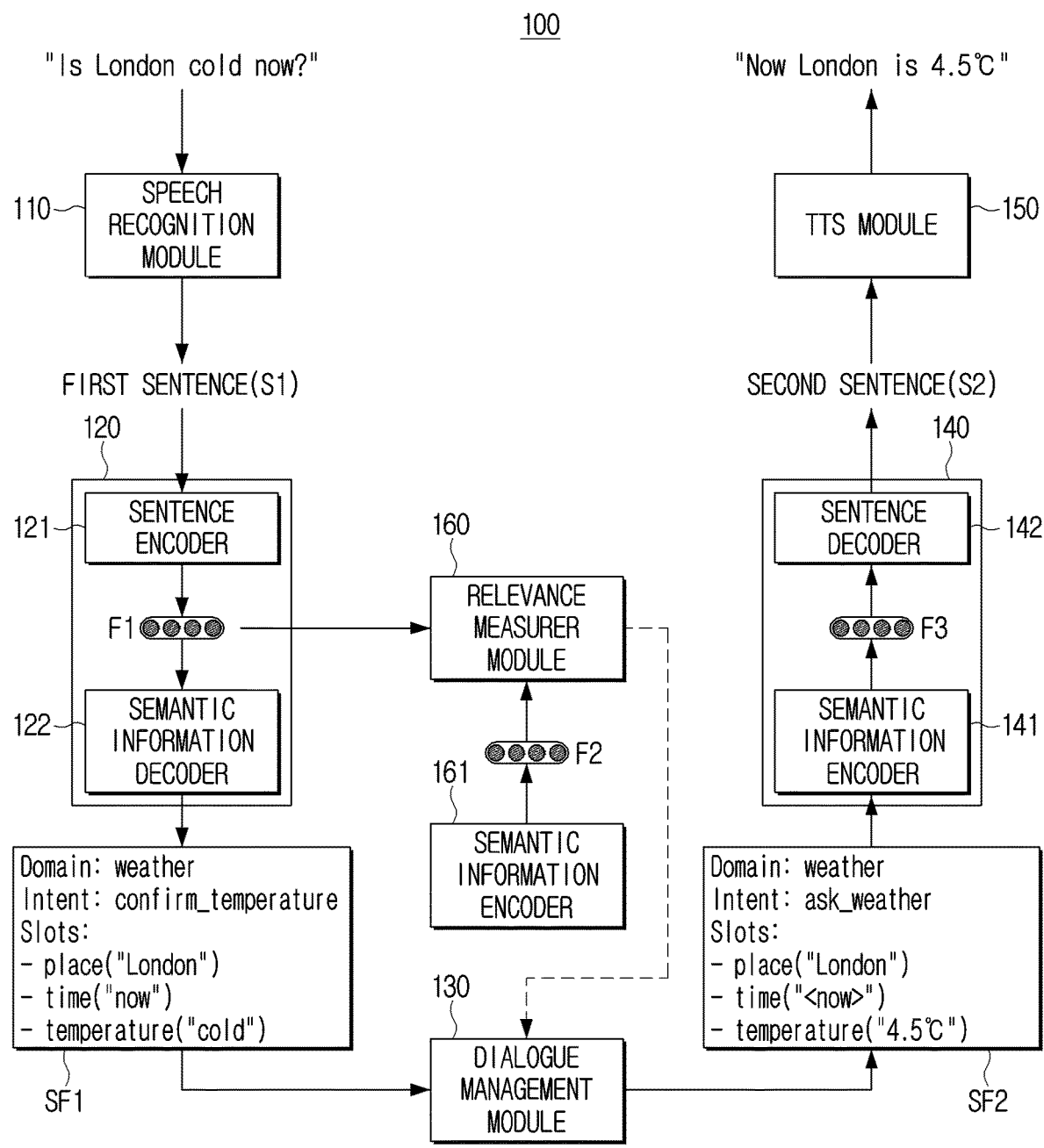
FIG. 6 is a diagram illustrating an example operation of an electronic apparatus when a speech signal corresponding to a supportable service is obtained according to an embodiment.

A method of controlling the electronic apparatus 100 will be described through specific examples of FIG. 5 will be described in greater detail below. FIG. 6 is a diagram illustrating an example operation of an electronic apparatus when a speech signal corresponding to a supportable service is obtained according to an embodiment.

Referring to FIG. 6, the electronic apparatus 100 may obtain a speech signal ("Is London cold now?") and obtain the first sentence S1 by inputting the obtained speech signal to the speech recognition module 110. The electronic apparatus 100 may obtain the first sentence S1 by obtaining a speech signal asking the current weather of London.

The electronic apparatus 100 may input the first sentence S1 to the sentence encoder 121 to obtain the first feature value F1, and input the first feature value F1 to the semantic information decoder 122 to obtain the first semantic information SF1. In this example, the first semantic information SF1 may include a slot including information about the domain ("weather"), the intent ("confirm_temperature"), and the slot ("place/time/temperature").

The electronic apparatus 100 may input the first semantic information SF1 to the semantic information encoder 161 to obtain the second feature value F2. The electronic apparatus 100 may input the first feature value F1 and the second feature value F2 to the relevance measurer module 160 to obtain a score for relevance to the first sentence S1 and the first semantic information SF1.

If the obtained score is greater than the predetermined score, the electronic apparatus 100 may input the first semantic information SF1 to the dialogue management module 130 to obtain the second semantic information SF2. In this example, the second semantic information SF2 may include a slot including information about the domain ("weather"), the intent ("ask_weather"), and the slot ("place/time/temperature"). The electronic apparatus 100 may input the second semantic information SF2 to the natural language generation module 140 to obtain the second sentence S2. The electronic apparatus 100 may input the second semantic information SF2 to the semantic information encoder 141 to obtain the third feature value F3, and the third feature value F3 may be input to the sentence decoder 142 to obtain the second sentence S2. The electronic apparatus 100 may input the second sentence S2 to the TTS module 150 to obtain a speech signal ("Now London is 4.5° C.") and output the obtained speech signal.

Figure 7:
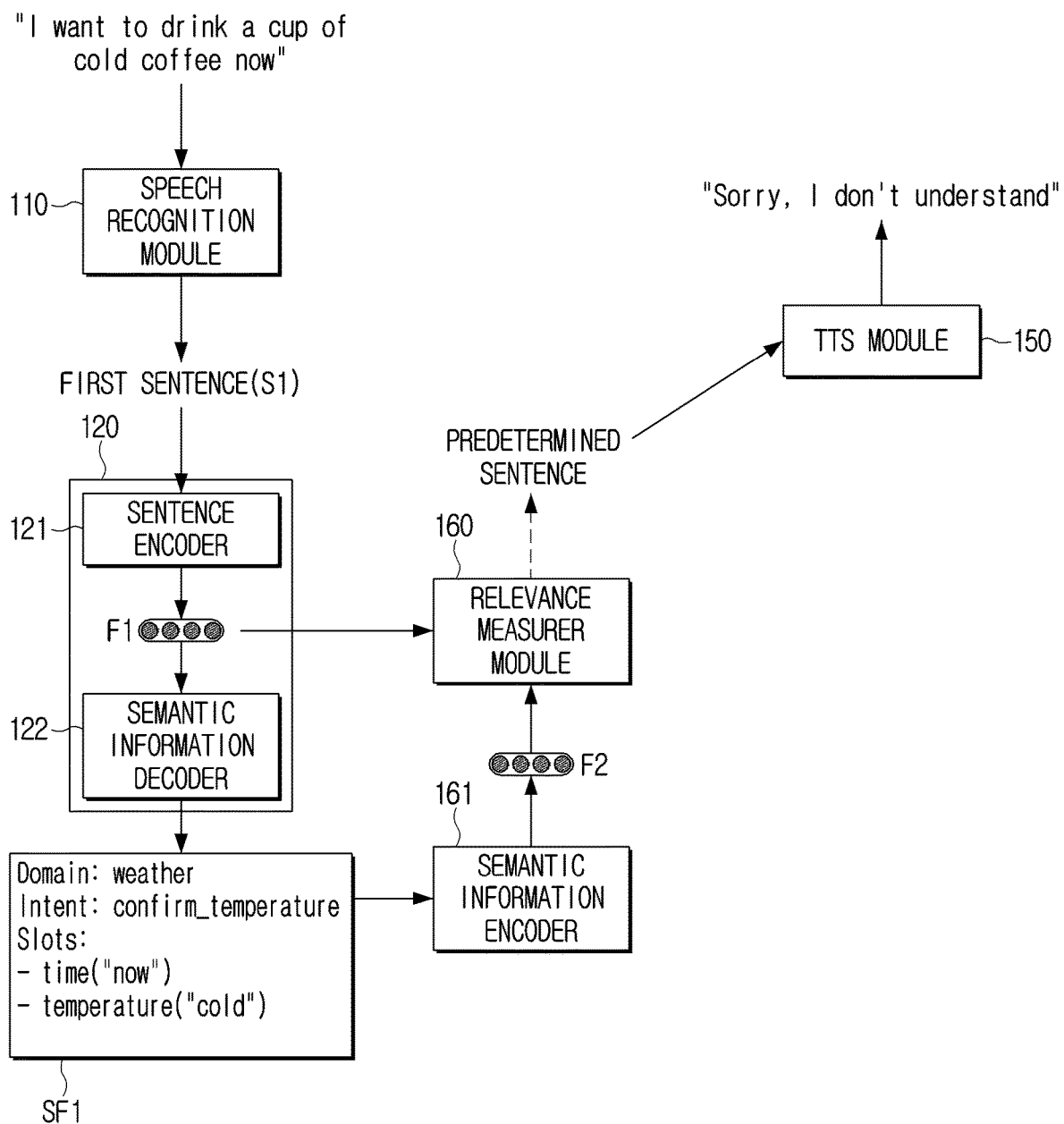
FIG. 7 is a diagram illustrating an example operation of an electronic apparatus when a speech signal corresponding to a non-supportable service is obtained according to an embodiment.

FIG. 7 is a diagram illustrating an example operation of an electronic apparatus when a speech signal corresponding to a non-supportable service is obtained according to an embodiment. Descriptions overlapping with FIGS. 5 and 6 may not be repeated here.

Referring to FIG. 7, the electronic apparatus 100 may obtain a speech signal ("I want to drink a cup of cold coffee now"). The electronic apparatus 100 may sequentially input the obtained speech signal to the speech recognition module 110 and the natural language understanding module 120 to obtain the first semantic information SF1. In this example, the first semantic information SF1 may include a domain ("weather") and an intent ("confirm_temperature"). For example, the first semantic information SF1 may include information not corresponding to the obtained speech signal.

The electronic apparatus 100 may obtain the second feature value F2 by inputting the first semantic information SF1 to the semantic information encoder 161 and obtain a score of relevance between the first sentence S1 and the first semantic information SF1 by inputting the first feature value F1 and the second feature value F2 to the relevance measurer module 160.

If the obtained score is less than the predetermined score, the electronic apparatus 100 may obtain a predetermined sentence (e.g., "I don't understand"). The predetermined sentence may be pre-stored on the memory included in the electronic apparatus 100. The electronic apparatus 100 may input a predetermined sentence into the TTS module 150 to obtain a speech signal ("Sorry, I don't understand") corresponding to a predetermined sentence, and output the obtained speech signal.

For convenience, the electronic apparatus 100 which obtains one semantic information by inputting one sentence into the natural language understanding module 120 is described, but it is not limited thereto and the electronic apparatus 100 may obtain a plurality of semantic information by inputting one sentence into the natural language understanding module 120.

Figure 8:
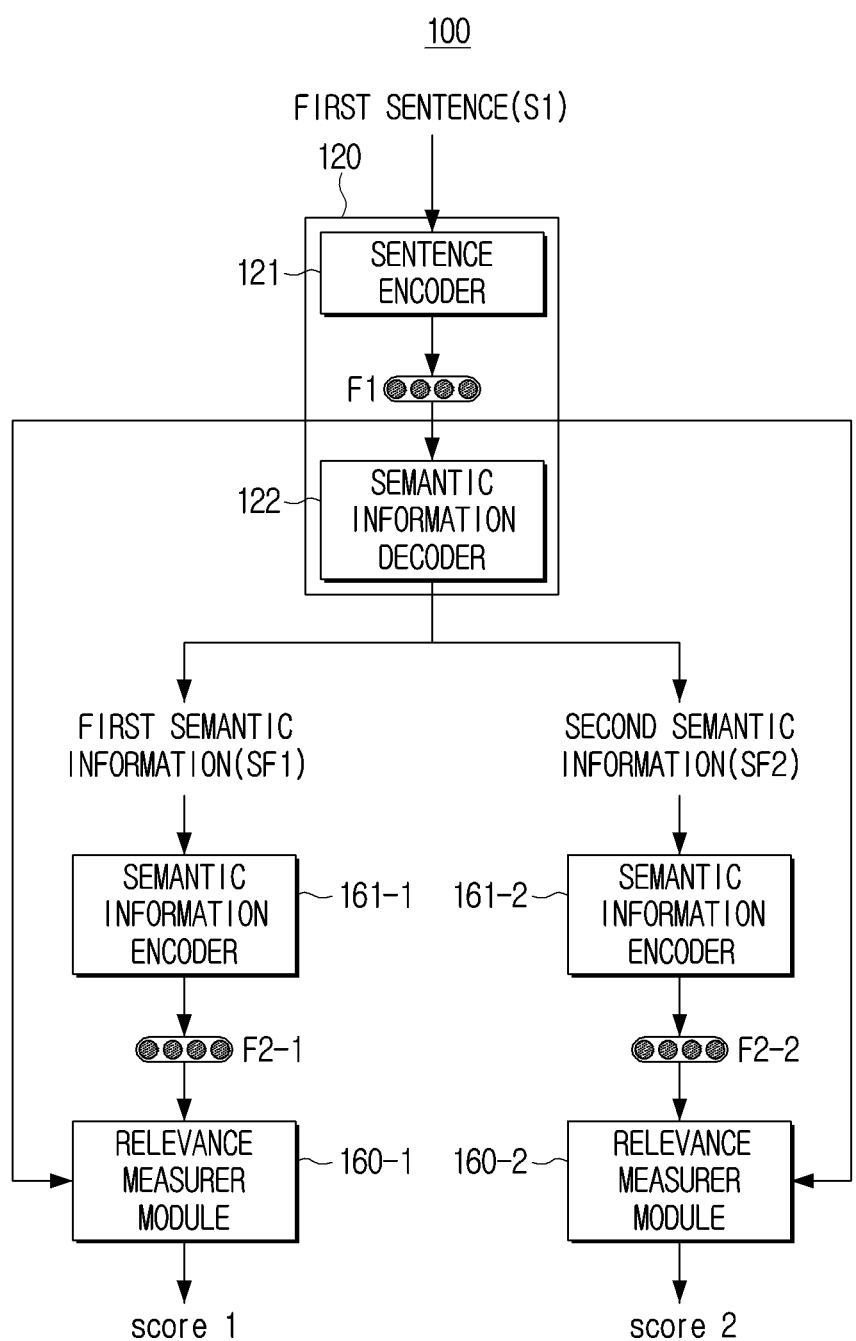
FIG. 8 is a diagram illustrating an example method of an operation of an electronic apparatus when a plurality of semantic information corresponding to one input sentence is obtained according to an embodiment.

FIG. 8 is a diagram illustrating an example method of an operation of an electronic apparatus when a plurality of semantic information corresponding to one input sentence is obtained according to an embodiment.

Referring to FIG. 8, the electronic apparatus 100 may input the first sentence S1 to the natural language understanding module 120 to obtain the first semantic information SF1 and the second semantic information SF2. In this example, the first semantic information SF1 and the second semantic information SF2 may correspond to the first sentence S1, respectively. For example, when the first sentence S1 is "Please turn of KBS," the domain of the first semantic information SF1 is a TV and the domain of the second semantic information SF2 may be a radio.

The electronic apparatus 100 may input the first semantic information SF1 to the semantic information encoder 161-1 to obtain the second-one feature value F2-1, and input the second-one feature value F2-1 and the first feature value F1 to the relevance measurer module 160-1 to obtain the first score (score 1). The electronic apparatus 100 may input the second semantic information SF2 to the semantic information encoder 161-2 to obtain the second-two feature value F2-2, and input the second-two feature value F2-2 and the first feature value F1 to the relevance measurer module 160-2 to obtain the second score (score 2).

The electronic apparatus 100 may compare the obtained first score and the second score with a predetermined reference score to obtain semantic information corresponding to a score greater than a predetermined reference score among the first score and the second score. For example, if the first score is greater than the predetermined reference score, the electronic apparatus 100 may obtain the first semantic information SF1 corresponding to the first score. As another example, if the first score and the second score are greater than the predetermined reference score, the electronic apparatus 100 may obtain the first semantic information SF1 and the second semantic information SF2 corresponding to the first score and the second score, respectively.

As described above, the electronic apparatus 100 may provide a user with a response based on the semantic information corresponding to the score greater than the predetermined reference score. The electronic apparatus 100 may input semantic information corresponding to a score greater than a predetermined reference score among the first semantic information SF1 and the second semantic information SF2 to the dialogue management module 130 to obtain semantic information for a user response, and input semantic information for a user response to the natural language generation module 140 to obtain a response sentence. The electronic apparatus 100 may input the response sentence to the TTS module 150 to obtain a speech signal and output the obtained speech signal.

If there are a plurality of semantic information corresponding to a score greater than a predetermined reference score, the electronic apparatus 100 may provide the user with a response based on the plurality of semantic information. For example, when the electronic apparatus 100 obtains the first sentence ("Please turn on KBS") (S1), the electronic apparatus 100 may obtain the first semantic information SF1 having the "TV" as the domain information and the second semantic information SF2 having the "radio" as domain information. The electronic apparatus 100 may have both the first score and the second score for each of the first semantic information SF1 and the second semantic information SF2 being greater than a predetermined reference score. The electronic apparatus 100 may obtain the response sentence ("Do you want to turn on TV or radio?") based on the first semantic information SF1 and the second semantic information SF2.

The electronic apparatus 100 may provide the user with a response based on some of the various semantic information. For example, the electronic apparatus 100 may select semantic information corresponding to the greatest score and provide a response based on the selected semantic information. For example, if the first score (score 1) is 0.9 and the second score (score 2) is 0.8, the electronic apparatus 100 may select the first semantic information SF1 corresponding to the first score (score 1) and having the "TV" as the domain information. The electronic apparatus 100 may obtain the response sentence ("Channel is changed to KBS") based on the first semantic information SF1.

It has been described that the electronic apparatus 100 may obtain semantic information through the natural language understanding module and generates a response sentence to be provided to the user based on the obtained semantic information, but the electronic apparatus 100 may generate a response sentence without obtaining semantic information. The electronic apparatus 100 may be implemented as an end-to-end dialog system. Hereinafter, an example embodiment of the electronic apparatus 100 implemented as the end-to-end dialog system will be described in greater detail below with reference to FIG. 9.

Figure 9:
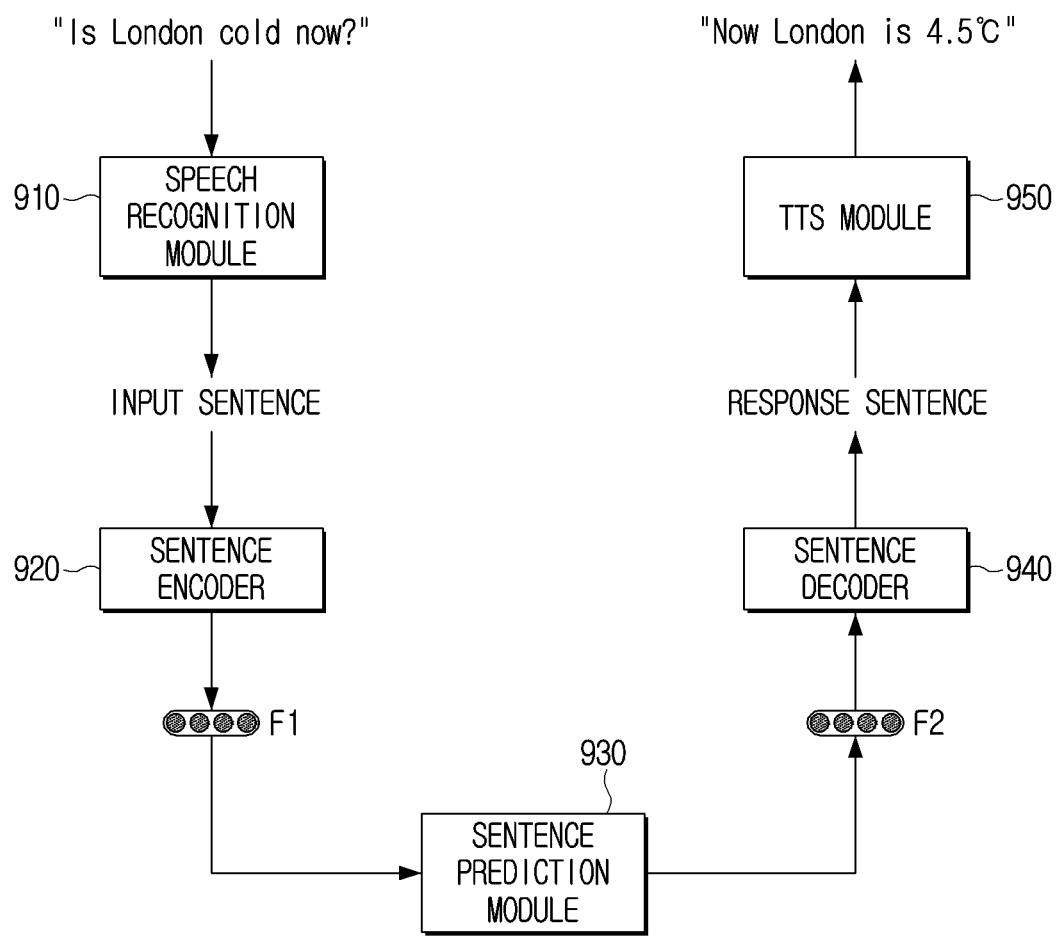
FIG. 9 is a diagram illustrating an example operation of an electronic apparatus according to an embodiment.

FIG. 9 is a diagram illustrating an example electronic apparatus according to an embodiment.

The electronic apparatus 100 may include a speech recognition module (e.g., including processing circuitry and/or executable program elements) 910, a sentence encoder (e.g., including processing circuitry and/or executable program elements) 920, a sentence prediction module (e.g., including processing circuitry and/or executable program elements)

930, a sentence decoder (e.g., including processing circuitry and/or executable program elements) 940, and a TTS module (e.g., including processing circuitry and/or executable program elements) 950.

The electronic apparatus 100 may obtain a speech signal ("Is London cold now?") from the user, and input the obtained speech signal to the speech recognition module 910 to obtain an input sentence. The electronic apparatus 100 may input the input sentence to the sentence encoder 920 to obtain the first feature value F1, and input the first feature value F1 to the sentence prediction module 930 to obtain the second feature value F2. The electronic apparatus 100 may input the second feature value F2 to the sentence decoder 940 to obtain a response sentence. The electronic apparatus 100 may be implemented as an end-to-end dialog system. The electronic apparatus 100 may not generate semantic information based on the first feature value F1 and the second characteristic value F2, but may directly obtain a response sentence. The electronic apparatus 100 may input a response sentence to the TTS module 950 to obtain a response signal ("Now London is 4.5° C."), and output the obtained response signal to provide a response to the user.

Figure 10:
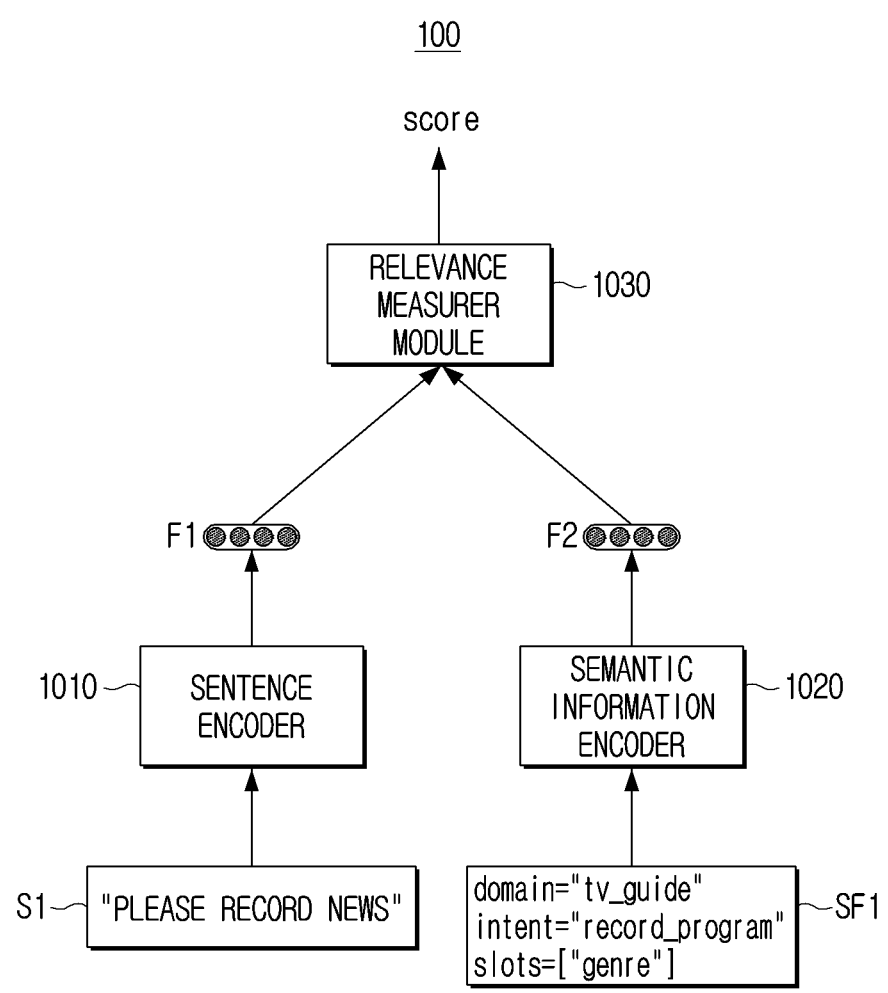
FIG. 10 is a diagram illustrating an example operation of an electronic apparatus according to an embodiment.

A related-art dialogue system may only provide a response to previously learned sentences. For example, as illustrated in FIG. 10, if unlearned sentences ("Please record news") are obtained, the electronic apparatus 100 may not understand the unlearned sentence and may fail to provide an appropriate response thereto. The electronic apparatus 100 according to the disclosure, however, may provide an optimal and/or improved response to the user even when a speech signal is obtained for a sentence that is not learned previously. The electronic apparatus 100 may be implemented, for example, through zero-shot learning.

FIG. 10 is a diagram illustrating an example operation of an electronic apparatus according to an embodiment.

The electronic apparatus 100 may input the first sentence ("Please record news") (S1) to the sentence encoder 1010 to obtain the first feature value F1, and obtain the first semantic information SF1 to the semantic information encoder 1020 to obtain the second feature value F2. The electronic apparatus 100 may input the data (domain, intent, slot) included in the first semantic information SF1 in a text unit ("TV_guide", "record_program", "genre"), instead of a symbol unit (e.g., 0, 1, 2, or the like).

The electronic apparatus 100 may input the first feature value F1 and the second feature value F2 to the relevance measurer module 1030 to obtain a score for the relevance between the first sentence S1 and the first semantic information SF1, and train the sentence encoder 1010 and the semantic information encoder 1020 so that the obtained score is greater than the preset value. As described above, as the electronic apparatus 100 inputs the first semantic information SF1 in a text unit to the semantic information encoder 1020, the learned electronic apparatus 100 may understand the input sentence or semantic information. Thus, although the electronic apparatus 100 obtains a speech signal corresponding to an unlearned sentence, the electronic apparatus 100 may understand the semantics of the sentence for the obtained speech signal to provide the appropriate response.

Figure 11:
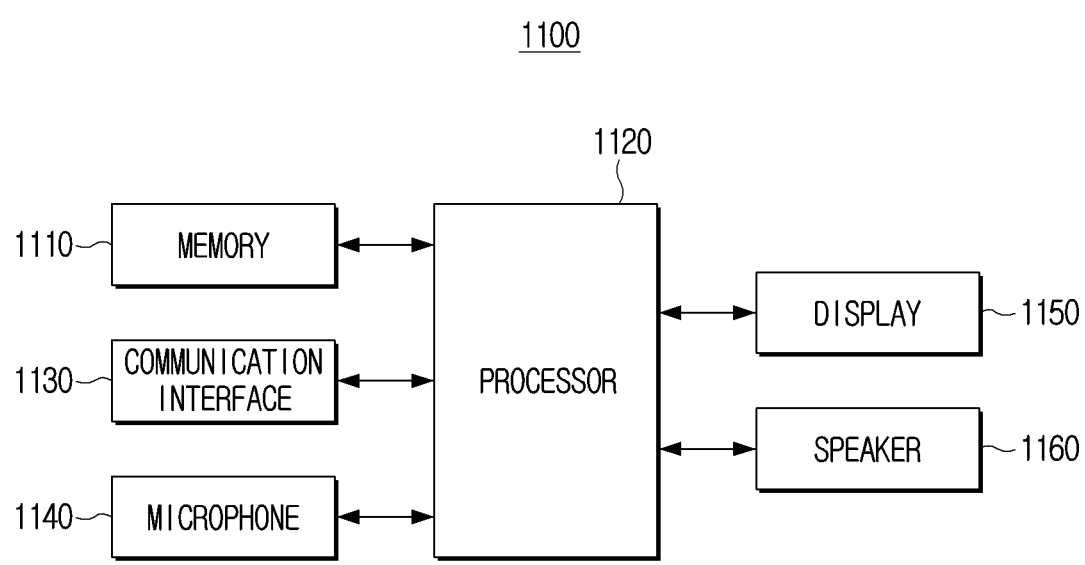
FIG. 11 is a block diagram illustrating an example configuration of an example electronic apparatus according to an embodiment.

FIG. 11 is a block diagram illustrating an example configuration of an electronic apparatus according to an embodiment. As illustrated in FIG. 11, an electronic apparatus 1100 may include a memory 1110, a processor (e.g., including processing circuitry) 1120, a communication interface (e.g., including communication circuitry) 1130, a microphone 1140, a display 1150, and a speaker 1160. Some configurations of the electronic apparatus 1100 of FIG. 11 may be added or omitted according to types of the electronic apparatus 1100.

Figure 12:
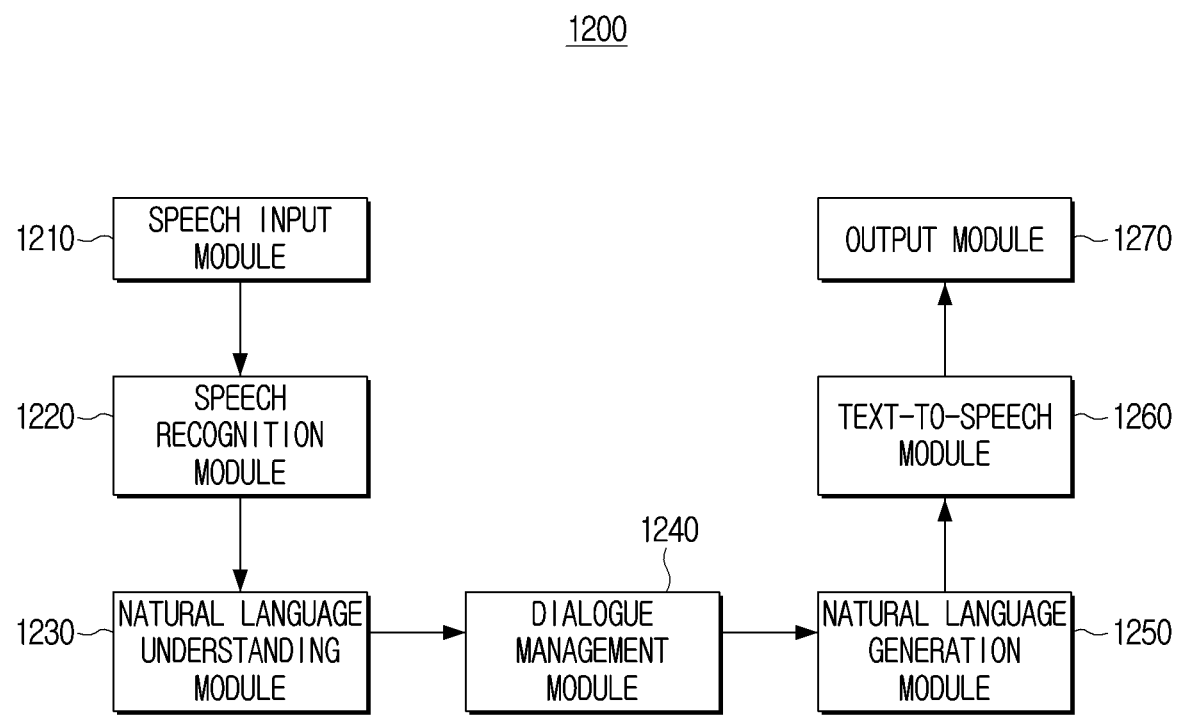
FIG. 12 is a block diagram illustrating an example dialogue system according to an embodiment.

The memory 1110 may store various programs and data that provide for control of operations of the electronic apparatus 1100. The memory 1110 may be implemented, for example, as a non-volatile memory, a volatile memory, a flash memory, a hard disk drive (HDD), a solid state drive (SSD), or the like. The memory 1110 may be accessed by the processor 1120 and reading/writing/modifying/deleting/updating of data by the processor 1120 may be performed. The memory 1110 may store the AI agent for implementation with the dialogue system. The electronic apparatus 1100 may utilize the AI agent to generate a natural language response to the input user utterance or obtain a control command. At this time, the AI agent is a dedicated program to provide AI-based services (for example, speech recognition services, secretarial services, translation services, search services, etc.) and may be executed by existing general-purpose processors (for example, central processing unit (CPU)) or separate AI-only processors (for example, graphics processing unit (GPU), neural processing unit (NPU)). The memory 1110 may include a plurality of configurations (or modules) forming a dialogue system as illustrated in FIG. 12.

The communication interface 1130 may include various communication circuitry and communicate with other devices of various types according to various communication methods. The communication interface 1130 may include, for example, and without limitation, a Wi-Fi module, a Bluetooth module, an infrared communication module, a wireless communication module, or the like. The processor 1120 may communicate with various devices using the communication interface 1130.

The microphone 1140 is configured to receive a user speech and may be provided in the electronic apparatus 1100, but this is merely an example, and the microphone 1140 may be connected to the exterior of the electronic apparatus 1100 by wire or wirelessly. The microphone 1140 may receive a user speech to control the electronic apparatus 1100 or an external device around the electronic apparatus 1100.

The display 1150 may be implemented as any of various types of a display such as, for example, and without limitation, a liquid crystal display (LCD), an organic light emitting diode (OLED) display, a plasma display panel (PDP), or the like. The display 1150 may include a driving circuit and a backlight unit, which may be implemented in the form of an a-si TFT, a low temperature poly silicon (LTPS) TFT, an organic TFT (OTFT). The display 150 may be implemented as a touch screen coupled with a touch sensor, a flexible display, a third-dimensional display (3D display), or the like. The display 1150 according to an embodiment may include a display panel for outputting an image and a bezel for housing a display panel. In particular, the bezel according to an embodiment may include a touch sensor (not shown) to sense a user interaction. The display 1150 may provide a response result for the user speech as a text or an image format.

The speaker 1160 may be an element to audibly output various audio data, various alarm sounds, a speech message, or the like. The electronic apparatus 1100 may include an audio output device such as the speaker 1160 or may include an output device such as an audio output terminal. The speaker 1160 may provide a response result, an operation result, or the like, for a user speech as a speech format.

The electronic apparatus 1100 may include an input interface (not shown) for receiving a user command for controlling the electronic apparatus 1100. The input interface may be implemented with a device such as a button, a touch pad, a mouse, and a keyboard, or a touch screen capable of performing both the display function and the manipulation input function described above. The buttons may be various types of buttons, such as mechanical buttons, touch pads, wheels, etc., formed in an arbitrary region, such as a front portion or a side portion, a rear portion, or the like, of the exterior of the main body of the electronic apparatus 1100.

The processor 1120 may include various processing circuitry and be electrically coupled to the memory 1110 to control the overall operation of the electronic apparatus 1100. The processor 1120 may control the electronic apparatus 1100 to obtain a speech signal by executing at least one instruction stored in memory 1110 and obtain a first sentence based on the speech signal. The processor 1120 may input the first sentence into the natural language understanding module to obtain the first feature value for the first sentence. The processor 1120 may obtain first semantic information corresponding to the first sentence and input the first semantic information to the natural language generation module to obtain the second feature value for the first semantic information. The processor 1120 may train the natural language understanding module and the natural language generation module so that the first feature value and the second feature value exist within a predetermined distance in the vector space.

The processor 1120 may obtain one feature value among the first feature value and the second feature value, obtain the first module by inputting the obtained one feature value to the discriminator module trained to predict a module generating the obtained feature value, and train the natural language understanding module and the natural language generation module so that the first module and the second module actually generating the obtained feature value are different.

The processor 1120 may obtain the first score by receiving a plurality of feature values, and inputting the first feature value and the second feature value to the relevance measurer module trained to obtain a score associated with a degree of relevance of the plurality of feature values, and train the natural language understanding module and the natural language generation module so that the first score is greater than a predetermined score. The processor 1120 may obtain a second score for the degree of relevance of the first sentence and the first semantic information, and train the relevance measurer module so that the difference between the first score and the second score is less than the predetermined score.

The processor 1120 may input the first sentence into the natural language understanding module to obtain the second semantic information, and train the natural language understanding module so that the difference between the first semantic information and the second semantic information is minimized. The natural language understanding module may include the first encoder and the first decoder, and the processor 1120 may input the first sentence to the first encoder to obtain the first feature value, and input the first feature value to the first decoder to obtain the second semantic information. The first decoder may include a plurality of decoders corresponding to a plurality of semantic items included in the second semantic information. The processor 1120 may obtain the first feature value based on a first intermediate feature value output from the plurality of decoders, respectively.

The processor 1120 may input the first semantic information to the natural language generation module to obtain the second sentence, and train the natural language generation module so that the semantic difference between the first sentence and the second sentence is minimized. The natural language generation module may include the second encoder and the second decoder, and the processor 1120 may input the first semantic information to the second encoder to obtain the second feature value. The processor 1120 may then input the second feature value into the second decoder to obtain the second sentence. The second encoder may include a plurality of encoders corresponding to a plurality of semantic items included in the first semantic information, and the processor 1100 may obtain a second feature value based on a second intermediate feature value output from the plurality of encoders, respectively.

The functionality associated with artificial intelligence according to the disclosure operates via the processor 1120 and the memory 1110. The processor 1120 may be configured with one or a plurality of processors. The one or more processors may include, for example, a general purpose processor, such as, for example, and without limitation, a central processing unit (CPU), an application processor (AP), a digital signal processor (DSP), or the like, a graphics-only processor such as a graphics processing unit (GPU), a vision processing unit (VPU), an artificial intelligence-only processor such as a neural processing unit (NPU), or the like. The one or more processors control the processing of the input data in accordance with a predefined operating rule or AI model stored in memory 1110. Alternatively, if one or a plurality of processors is an AI-only processor, the AI-only processor may be designed with a hardware structure specialized for the processing of a particular AI model.

The pre-defined operating rule or AI model is made through learning. The basic AI model may be trained using a plurality of learning data by a learning algorithm, so that a predefined operation rule or AI model set to perform a desired feature (or a purpose) is generated. Such learning may be accomplished in a device itself in which artificial intelligence according to the disclosure is performed, and may be implemented through a separate server and/or system. Examples of learning algorithms include, but are not limited to, supervised learning, unsupervised learning, semi-supervised learning, generative adversarial neural network, reinforcement learning, or the like.

The AI model may include a plurality of neural network layers. Each of the plurality of neural network layers may have a plurality of weight values, and may perform a neural network algorithm through algorithm between an algorithm result of a previous layer and a plurality of weights. A plurality of weights having a plurality of neural network layers may be optimized and/or improved by a learning result of the AI model. For example, a plurality of weights may be updated such that a loss value or cost value obtained in the AI model during the learning process is reduced or minimized. The artificial neural network may include, for example, and without limitation, a deep neural network (DNN), a convolutional neural network (CNN), a recurrent neural network (RNN), a Restricted Boltzmann Machine (RNN), a Deep Belief Network (DBN), a Bidirectional Recurrent Deep Neural Network (BRDNN), deep Q-Networks, or the like.

FIG. 12 is a block diagram illustrating an example dialogue system according to an embodiment. The dialogue system 1200 in FIG. 12 is configured to perform dialog with a virtual AI agent through natural language or control the electronic apparatus 1100, and according to an embodiment, a module included in the dialogue system 1200 may be stored in the memory 1110 of the electronic apparatus 1100 but this is merely an example, and may be implemented in a format in which hardware and software is combined. At least one module included in the dialogue system 1200 may be included in at least one external server.

Referring to FIG. 12, the dialogue system 1200 may include a speech input module (e.g., including processing circuitry and/or executable program elements) 1210, a speech recognition (SR) module (e.g., including processing circuitry and/or executable program elements) 1220, a natural language understanding (NLU) module (e.g., including processing circuitry and/or executable program elements) 1230, a dialogue management (DM) module (e.g., including processing circuitry and/or executable program elements) 1240, a natural language generator (NLG) module (e.g., including processing circuitry and/or executable program elements) 1250, a TTS module (e.g., including processing circuitry and/or executable program elements) 1260, and an output module (e.g., including output circuitry) 1270.

The speech input module 1210 may receive user speech in the form of speech data. The speech input module 1210 may include a microphone and may receive an analog form of audio signal including user speech via a microphone and convert the analog signal to a digital signal. In one embodiment, the speech input module 1210 may remove the noise component from the digital signal to obtain speech data corresponding to the user speech. According to another embodiment, the speech input module 1210 may not remove a separate noise component, and then noise included in the digital signal may be removed via the speech recognition model. The user speech received via the speech input module 1210 may be in the form of a sentence or a phrase that includes at least one text, but this only one embodiment and may include a plurality of sentences or phrases.

The microphone included in the speech input module 1210 may be provided inside the electronic apparatus 1100, but this is merely an example, and the microphone may be provided outside and connected to the electronic apparatus 1100 by wire or wirelessly. The speech input module 1210 may include a communication module for receiving a user speech from an external device.

The speech recognition module 1220 may convert user speech in the form of speech data received from the speech input module 1210 into text data. In this example, the text data is data including character codes, and the speech data may be data including frequency information on the speech of the user. The speech recognition module 1220 may include an acoustic model and a language model. The acoustic model may include information related to vocalization, and the language model may include information about unit phoneme information and the combination of unit phoneme information. The speech recognition module may convert the user speech into text data using information related to the vocalization and information on the unit phoneme information.

The natural language understanding module 1230 may perform semantic analysis for a sentence obtained through the speech recognition module 1220 to understand a domain and a user's intent associated with a user speech. The natural language understanding module 1230 may perform semantic analysis using semantic matching.

The dialogue management module 1240 may provide a response to the user's speech based on at least one of a domain, a user intent, and a slot obtained via the natural language understanding module 1230. The dialogue manager module 1240 may provide a response to the user's speech based on the knowledge base. The knowledge base may be included in the electronic apparatus 1100, but this is only one embodiment, and may be included in an external server.

The natural language generation module 1250 may change the specified information into a text form. The information changed in a text form may be in the form of a natural language. The designated information may be, for example, response information about the question or information (e.g., feedback information about the user input) that guides further input of the user. The information converted in a text form may be displayed on the display of the electronic apparatus 1100, or may be converted in a speech form by the text-to-speech module 1260.

The text-to-speech module 1260 may change text-format information to speech-format information. The text-to-speech module 1260 may change a sentence (or text data) received from the natural language generation module 1250 to speech data-format information.

The output module 1270 may output information in the form of speech data received from the text-to-speech module 1260. The output module 1270 may include various output circuitry and output information in the form of speech data through a speaker or a speech output terminal. The output module 1270 may output information in the form of text data obtained through the natural language generation module 1250 through a display or an image output terminal.

Including a speech recognition module and a natural language understanding module inside the electronic apparatus 1100 has been described in the above embodiment, but this is merely an example, and at least one of the speech recognition module and the natural language understanding module may exist in an external server. For example, the speech recognition module may be provided in the electronic apparatus 100 and the natural language understanding module may exist in the server.

Figure 13:
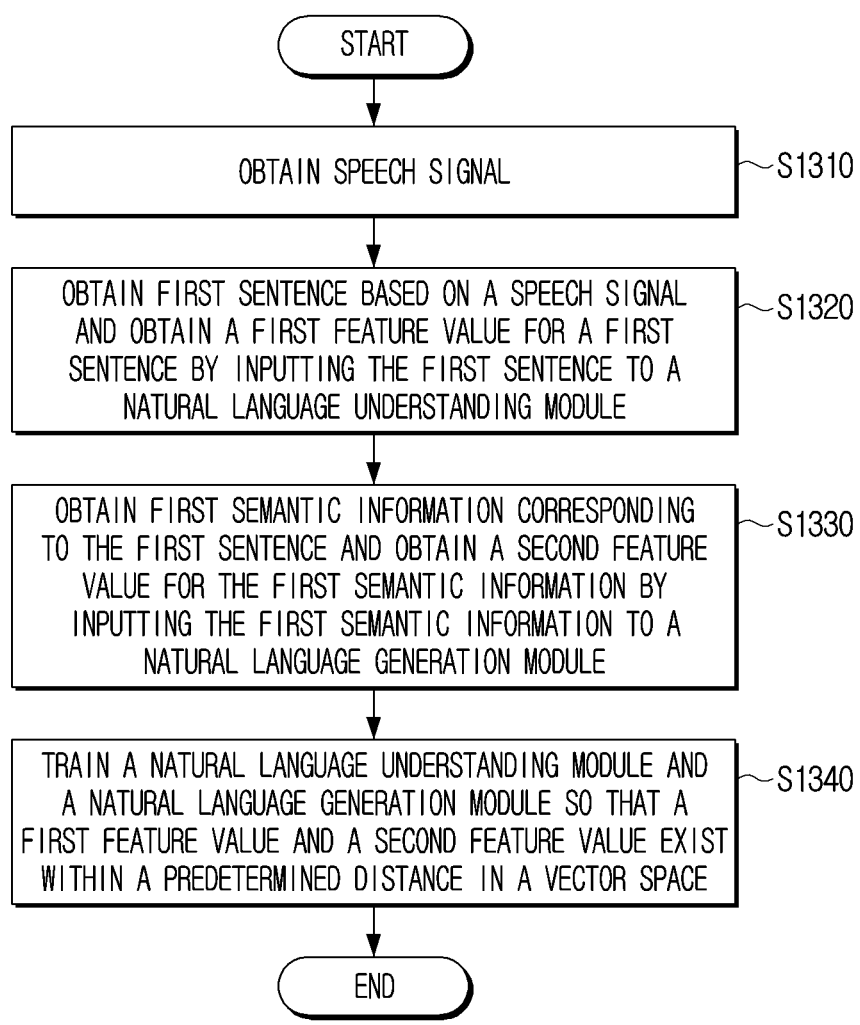
FIG. 13 is a flowchart illustrating an example method of controlling of an electronic apparatus according to an embodiment.

FIG. 13 is a flowchart illustrating an example method for controlling of an electronic apparatus according to an embodiment.

Referring to FIG. 13, the electronic apparatus 100 may obtain a speech signal in operation S1310. The electronic apparatus 100 may obtain a first sentence based on the speech signal by inputting the first sentence into the natural language understanding module to obtain the first feature value for the first sentence in operation S1320. The electronic apparatus 100 may input a speech signal to the speech recognition module 1220 to obtain a first sentence. Hereinafter, a detailed description of the operations may be described with reference to FIG. 5.

The electronic apparatus 100 may obtain the first semantic information corresponding to the first sentence and obtain the second feature value for the first semantic information by inputting the first semantic information to the natural language generation module in operation S1330. The first semantic information may be labeled learning data. The operation has been described in FIG. 2 and will not be further described.

The electronic apparatus 100 may train the natural language understanding module and the natural language generation module so that the first feature value and the second feature value exist within a predetermined distance in the vector space in operation S1340. The electronic apparatus 100 may train the natural language understanding module and the natural language generation module using a relevance measurer module. The electronic apparatus 100 may train the natural language understanding module and the natural language generation module using a discriminator module. A detailed description thereof is made above with reference to FIGS. 2 and 3.

The various example embodiments described above may be implemented in a recordable medium which is readable by computer or a device similar to computer using software, hardware, or the combination of software and hardware. In some cases, embodiments described herein may be implemented by the processor itself. According to a software implementation, embodiments such as the procedures and functions described herein may be implemented with separate software modules. Each of the above-described software modules may perform one or more of the functions and operations described herein.

The computer instructions for performing the processing operations according to the various embodiments described above may be stored in a non-transitory computer-readable medium. The computer instructions stored in this non-transitory computer-readable medium cause the above-described specific device to perform the processing operations according to the above-described various embodiments when executed by the processor of the specific device.

The non-transitory computer readable medium may refer, for example, to a medium that stores data, such as a register, a cache, a memory or etc., and is readable by an apparatus. For example, the aforementioned various applications, instructions, or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

The instructions may include a code generated by a compiler or a code executable by an interpreter. A machine-readable storage medium may be provided in the form of a non-transitory storage medium. Herein, the "non-transitory" denotes a storage medium that may not include a signal (e.g., electromagnetic wave) but is tangible, and does not distinguish the configuration in which a data is semi-permanently stored in a storage medium from the configuration in which a data is temporarily stored in a storage medium.

According to an embodiment, the method according to various embodiments disclosed herein may be provided in a computer program product. A computer program product may be exchanged between a seller and a purchaser as a commodity. A computer program product may be distributed in the form of a machine-readable storage medium (e.g., compact disc read only memory (CD-ROM)) or distributed online (e.g., download or upload) through an application store (e.g. PlayStore™) directly between two user devices (e.g., smartphones). In the configuration of on-line distribution, at least a portion of the computer program product may be stored temporarily or at least temporarily in a storage medium such as a manufacturer's server, a server of an application store, or a memory of a relay server.

The foregoing example embodiments and advantages are merely examples and are not to be understood as limiting the disclosure. The present teachings may be readily applied to other types of devices. Also, the description of the embodiments of the disclosure is intended to be illustrative, and not to limit the scope of the claims, and many alternatives, modifications, and variations will be apparent to those skilled in the art.

What is claimed is:

1. A method for controlling an electronic apparatus, the method comprising:
    obtaining a speech signal;
    obtaining a first sentence based on the speech signal and obtaining a first feature value for the first sentence by inputting the first sentence to a natural language understanding module;
    obtaining first semantic information corresponding to the first sentence and obtaining a second feature value for the first semantic information by inputting the first semantic information to a natural language generation module;
    obtaining a first score for relevance between the first feature value and the second feature value at least by inputting the first feature value and the second feature value to a relevance measurer module; and
    training the natural language understanding module and the natural language generation module at least by comparing the first score and a predetermined score.

2. The method of claim 1, wherein the training comprises:
    obtaining one feature value among the first feature value and the second feature value,
    obtaining a first module by inputting the obtained feature value to a discriminator module trained to predict a module that generates the obtained feature value, and
    training the natural language understanding module and the natural language generation module so that the first module is different from a second module that actually generates the obtained feature value.

3. The method of claim 1, wherein the training further comprises:
    training the natural language understanding module and the natural language generation module so that the first score is greater than the predetermined score.

4. The method of claim 3, further comprising:
    training the relevance measurer module;
    wherein the training the relevance measurer module comprises:
    obtaining a second score for a degree of relevance of the first sentence and the first semantic information, and
    training the relevance measurer module so that a difference between the first score and the second score is less than a predetermined score.

5. The method of claim 1, wherein:
    the obtaining the first feature value comprises obtaining second semantic information by inputting the first sentence to the natural language understanding module, and
    the training comprises training the natural language understanding module so that a difference between the first semantic information and the second semantic information is reduced.

6. The method of claim 5, wherein:
    the natural language understanding module comprises a first encoder and a first decoder,
    the obtaining the first feature value comprises:
    obtaining the first feature value by inputting the first sentence to the first encoder, and
    obtaining the second semantic information by inputting the first feature value to the first decoder.

7. The method of claim 6, wherein:
    the first decoder comprises a plurality of decoders corresponding to each of a plurality of semantic items included in the second semantic information, the obtaining the first feature value comprises obtaining the first feature value based on first intermediate feature values output from each of the plurality of decoders.

8. The method of claim 1, wherein:
the obtaining the second feature value comprises obtaining a second sentence by inputting the first semantic information to the natural language generation module, and
the training comprises training the natural language generation module so that a semantic difference between the first sentence and the second sentence is reduced.

9. The method of claim 8, wherein:
the natural language generation module comprises a second encoder and a second decoder,
the obtaining the second feature value comprises:
obtaining the second feature value by inputting the first semantic information to the second encoder; and
obtaining the second sentence by inputting the second feature value to the second decoder.

10. The method of claim 9, wherein:
the second encoder comprises a plurality of encoders corresponding to each of a plurality of semantic items included in the first semantic information,
the obtaining the second feature value comprises obtaining the second feature value based on second intermediate feature values output from each of the plurality of encoders.

11. An electronic apparatus comprising:
a memory configured to include at least one instruction; and
a processor connected to the memory configured to control the electronic apparatus,
wherein the processor, by executing the at least one instruction, is configured to control the electronic apparatus to:
obtain a speech signal,
obtain a first sentence based on the speech signal and obtain a first feature value for the first sentence by inputting the first sentence to a natural language understanding module comprising circuitry,
obtain first semantic information corresponding to the first sentence and obtain a second feature value for the first semantic information by inputting the first semantic information to a natural language generation module comprising circuitry,
obtain a first score for relevance between the first feature value and the second feature value at least by inputting the first feature value and the second feature value to relevance measurer module, and
train the natural language understanding module and the natural language generation module at least by comparing the first score and a predetermined score.

12. The electronic apparatus of claim 11, wherein the processor is configured to control the electronic apparatus to:
obtain one feature value between the first feature value and the second feature value,
receive a feature value and obtain a first module by inputting the obtained feature value to a discriminator module comprising circuitry trained to predict a module comprising circuitry that generates the input feature value, and
train the natural language understanding module and the natural language generation module to provide the first module different from a second module that actually generates the obtained feature value.

13. The electronic apparatus of claim 11, wherein the processor is configured to control the electronic apparatus to:
train the natural language understanding module and the natural language generation module so that the first score is greater than the predetermined score.

14. The electronic apparatus of claim 13, wherein the processor is configured to control the electronic apparatus to:
obtain a second score for a degree of relevance of the first sentence and the first semantic information, and
train the relevance measurer module so that a difference between the first score and the second score is less than a predetermined score.

15. The electronic apparatus of claim 11, wherein the processor is configured to control the electronic apparatus to:
obtain second semantic information by inputting the first sentence to the natural language understanding module, and
train the natural language understanding module so that a difference between the first semantic information and the second semantic information is reduced.

16. The electronic apparatus of claim 15, wherein:
the natural language understanding module comprises a first encoder and a first decoder,
the processor is configured to control the electronic apparatus to obtain the first feature value by inputting the first sentence to the first encoder and obtain the second semantic information by inputting the first feature value to the first decoder.

17. The electronic apparatus of claim 16, wherein:
the first decoder comprises a plurality of decoders corresponding to each of a plurality of semantic items included in the second semantic information, and
the processor is configured to control the electronic apparatus to obtain the first feature value based on first intermediate feature values output from each of the plurality of decoders.

18. The electronic apparatus of claim 11, wherein the processor is configured to control the electronic apparatus to:
obtain a second sentence by inputting the first semantic information to the natural language generation module, and
train the natural language generation module so that a semantic difference between the first sentence and the second sentence is reduced.

19. The electronic apparatus of claim 18, wherein:
the natural language generation module comprises a second encoder and a second decoder, and
the processor is configured to control the electronic apparatus to:
obtain the second feature value by inputting the first semantic information to the second encoder, and
obtain the second sentence by inputting the second feature value to the second decoder.

20. The electronic apparatus of claim 19, wherein:
the second encoder comprises a plurality of encoders corresponding to each of a plurality of semantic items included in the first semantic information,
the processor is configured to control the electronic apparatus to obtain the second feature value based on second intermediate feature values output from each of the plurality of encoders.

* * * * *